United States Patent
Deardurff et al.

(10) Patent No.: US 7,427,129 B2
(45) Date of Patent: Sep. 23, 2008

(54) BORONIC ACID CONTAINING DYES TO IMPROVE PERMANENCE OF IMAGES

(75) Inventors: Larrie A Deardurff, Corvallis, OR (US); James P Shields, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 279 days.

(21) Appl. No.: 10/772,725

(22) Filed: Feb. 4, 2004

(65) Prior Publication Data

US 2005/0168551 A1    Aug. 4, 2005

(51) Int. Cl.
*C09D 11/00* (2006.01)

(52) U.S. Cl. .............. 347/100; 106/31.27; 428/64.2

(58) Field of Classification Search ............ 347/100; 106/31.27; 428/64.2
See application file for complete search history.

(56) References Cited

U.S. PATENT DOCUMENTS

| | | | |
|---|---|---|---|
| 4,861,728 A | 8/1989 | Wagner | |
| 4,877,686 A * | 10/1989 | Riou et al. | 428/32.18 |
| 5,108,502 A | 4/1992 | Pawlowski et al. | |
| 5,137,833 A * | 8/1992 | Russell | 436/94 |
| 5,380,612 A * | 1/1995 | Kojima et al. | 430/49 |
| 5,631,364 A | 5/1997 | Sundrehagen et al. | |
| 5,739,318 A | 4/1998 | Frantzen et al. | |
| 5,973,025 A * | 10/1999 | Nigam et al. | 523/160 |
| 6,200,676 B1 * | 3/2001 | Matsubara et al. | 428/32.38 |
| 6,312,883 B1 | 11/2001 | Parton et al. | |
| 6,319,540 B1 | 11/2001 | Van Antwerp et al. | |
| 6,494,942 B1 * | 12/2002 | Deardurff et al. | 106/31.43 |
| 6,670,037 B1 * | 12/2003 | Okura et al. | 428/402 |
| 2004/0125169 A1 * | 7/2004 | Nakagawa et al. | 347/45 |

FOREIGN PATENT DOCUMENTS

EP    0596700 A1    5/1994

* cited by examiner

*Primary Examiner*—Manish S. Shah
*Assistant Examiner*—Laura E Martin

(57) ABSTRACT

A printing system including a boronic acid dye and a coated print medium. The boronic acid dye comprises a boric acid group or a boronic acid group attached to the dye. The boronic acid dye covalently binds to a polyhydroxylated material present in a coating layer of the print medium, fixing the boronic acid dye to the print medium. A method of reducing dye migration on a print medium is also disclosed.

16 Claims, 1 Drawing Sheet

BORONIC ACID CONTAINING DYES TO IMPROVE PERMANENCE OF IMAGES

BACKGROUND OF THE INVENTION

The use of inkjet printing in offices and homes has grown dramatically in recent years, which can be attributed in part to drastic reductions in the cost of inkjet printers and the substantial improvements in print resolution and overall print quality. While the print quality has drastically improved, research and development efforts continue toward improving image quality and permanence of inkjet images because these properties fall short of those produced by other printing and photographic techniques. Inkjet inks used in inkjet printing are typically aqueous-based and are formulated by dissolving a colorant, such as a dye or pigment, in an aqueous ink vehicle. The ink vehicle comprises additional components depending on the application and desired properties of the color inkjet ink.

Plain paper was initially used as a print medium in inkjet printing. While plain paper was adequate for printing text, it did not provide high resolution images. One recent development in inkjet technology has been the ability to print images that have a similar image quality to that of a photograph, which is commonly referred to as photographic image quality. A photographic quality image has saturated colors, high gloss and gloss uniformity, freedom of grain and coalescence, and a high degree of permanence. To provide the photographic quality image, the inkjet ink and print medium must be compatible with one another. In addition, the inkjet ink should have low puddling, good crusting resistance, good stability, low dye bleed, and a rapid dry time. The print medium used to print the photographic quality image must be fast drying and resist smearing, air, light, and moisture. In addition, the print medium should provide good color fidelity and high image resolution.

However, current print media commonly do not provide all of these properties. These print media generally include an ink receiving layer on a substrate, such as a paperbase or a photobase layer. The ink receiving layer includes multiple coatings that are formed from inorganic or organic materials, such as inorganic particles or organic polymers. The print media are categorized into two groups: porous media and swellable media. Porous media have an ink receiving layer that is formed from porous, inorganic particles bound with a polymer binder. Inkjet ink is absorbed into the pores of the inorganic particles and the colorant is fixed by mordants incorporated in the ink receiving layer or by the surface of the inorganic oxides. Porous media have a short drytime and good resistance to smearing because the inkjet ink is easily absorbed into the pores of the ink receiving layer. However, porous media do not exhibit good resistance to fade. In swellable media, the ink receiving layer is a continuous layer of a swellable, polymer matrix. When the inkjet ink is applied, the inkjet ink is absorbed by swelling of the polymer matrix and the colorant is immobilized inside the continuous layer. Since the colorant is protected from the outside environment, swellable media have greater resistance to light and dark/air fade than the porous media. However, the swellable media generally have reduced smearfastness and a longer drytime than porous media.

Some of the biggest failures of inkjet printed images are dye bleed (migration), hue shifts, and changes in optical density ("OD"). These undesirable properties are caused by migration of the dyes on the print medium and result in printed images having an unacceptable image quality. Dye bleed is the migration of the inkjet ink from its original location on the print medium. Dye bleed occurs under many conditions but is particularly prevalent at high temperature and high humidity, which is referred to herein as humid bleed. Printed images that are resistant to humid bleed are said to be humid fast. Hue shifts are caused by the different migration of cyan, magenta, and yellow dyes on the print medium. Hue shifts can occur in a matter of days and are easily observed by a user, which leads to user dissatisfaction with the inkjet printing products that he or she is using.

To reduce dye migration on plain paper, dyes having a boronic acid group have been used. The boronic acid group reacts with a cis-diol group to form a covalent bond. Plain paper includes cis-diol groups and, therefore, the boronic acid group forms a covalent bond with the plain paper. The covalent bond fixes the dye to the plain paper so that the dye does not migrate.

Dye migration has also been reduced by using dyes with low water solubility in the inkjet inks. Since these dyes are not very water soluble, the dyes precipitate when they are applied to the print medium, resulting in reduced dye migration. However, the amount of precipitation depends on the type of print medium that is used and, therefore, this solution is not optimized for use with all dyes. Furthermore, using dyes with low water solubility undesirably affects pen reliability because the dye has a tendency to precipitate and clog the pen. Another proposed solution has been to add mordants to the print medium. However, each mordant is typically specific for only a few dyes and, therefore, is not optimized for use with all dyes. In addition, the mordant causes problems with the image quality.

It would be desirable to provide an inkjet ink that provides reduced dye migration when printed on a coated print medium. The inkjet ink should also produce printed images having improved dye bleed, hue shifts, and OD changes when exposed to water or a humid environment.

BRIEF SUMMARY OF THE INVENTION

The present invention relates to a printing system that comprises a boronic acid dye and a print medium having a coating layer. The boronic acid dye comprises a boric acid group or a boronic acid group attached to the dye. The coating layer includes a polyhydroxylated material that comprises a polyhydroxylated compound having at least two hydroxyl groups on one molecule of the polyhydroxylated compound or at least two hydroxylated compounds, each hydroxylated compound having at least one hydroxyl group. The hydroxyl groups are positioned on one side of the polyhydroxylated material so they are available to bind with the boron of the boronic acid dye. The polyhydroxylated material comprises polyvinyl alcohol, silica, a modified silica, alumina, or modified alumina.

The present invention also relates to a method of reducing dye migration on a print medium. The method comprises providing a print medium having a coating layer. The coating layer comprises a polyhydroxylated material that comprises a polyhydroxylated compound having at least two hydroxyl groups on one molecule of the polyhydroxylated compound or at least two hydroxylated compounds, each hydroxylated compound having at least one hydroxyl group. An inkjet ink comprising a boronic acid dye is applied to the print medium. The boronic acid dye forms a covalent bond with the polyhydroxylated material in the coating layer to fix the dye to the print medium.

The present invention also encompasses a printed image having improved permanence. The printed image comprises a boronic acid dye covalently bonded to a coated print medium.

The coating layer comprises a polyhydroxylated material that comprises a polyhydroxylated compound having at least two hydroxyl groups on one molecule of the polyhydroxylated compound or at least two hydroxylated compounds, each hydroxylated compound having at least one hydroxyl group. The boronic acid dye forms a covalent bond with the hydroxyl groups present in the coating layer, fixing the boronic acid dye to the print medium.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Figure 1:
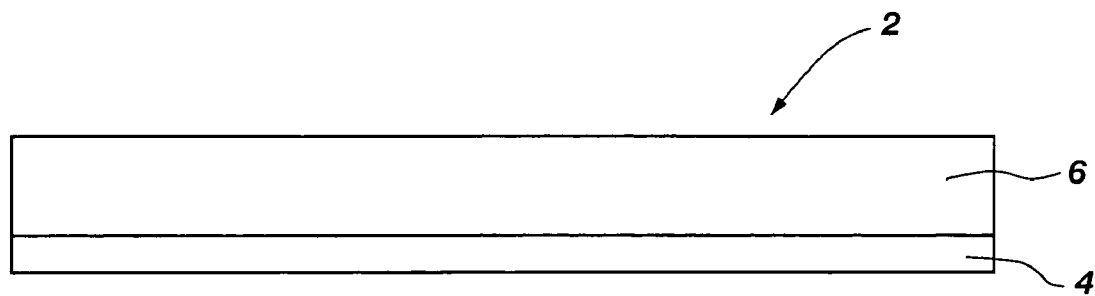
FIG. 1 shows a schematic illustration of a print medium used in one embodiment of the present invention.

A printing system having a boronic acid dye and a coated print medium is disclosed. The boronic acid dye is used in an inkjet ink to produce a printed image having improved permanence on the coated print medium. The boronic acid dye reacts with the coated print medium to produce the printed image, which has reduced dye bleed, hue shifts, and changes in optical density. As used herein, the term "boronic acid dye" refers to a compound having a boronic acid conjugate attached to the dye. It is also contemplated that the dye may have more than one boronic acid conjugate attached to it. The boronic acid conjugate may include a boric acid group (—B(OH)$_2$) or a boronic acid group, such as —B(OH)OX or —B(OR)$_2$, where X is a cation such as sodium, potassium, lithium, or NH$_y$(CH$_3$)$_z$, where y and z range from between 0 to 4, and where each R is independently selected from a C$_1$-C$_4$ alkyl or, if taken together, the two R groups form a C$_2$-C$_5$ alkylene chain. It is understood that the boronic acid conjugate may also exist in an anionic form, such as —B(OH)$_3^-$, depending on the pH of the inkjet ink.

The dye in the inkjet ink may be a conventional dye including, but not limited to, an azo, diazo, triphenylmethane, anthraquinone, methine, xanthine, oxazine, thiazine, azine, thiazole, quinolinone, aminoketone, nitro, nitroso, phthalocyanine, acridine, indamine, or indophenol dye. Preferably, the dye is an azo or diazo dye. The boronic acid conjugate may be attached to the dye directly or through an organic linker, as known in the art. The organic linker may be an alkyl group, an aryl group, or an alkylene group. The organic linker may also include a heteroatom, such as a nitrogen, sulfur, oxygen or phosphorus, substituted for at least one of the carbon atoms in the alkyl group, aryl group, or alkylene group. The organic linker may also be substituted with electron withdrawing substituents, depending on a desired pK$_a$ of the boronic acid dye. The boronic acid dye may be available commercially or may be synthesized by a known technique, such as disclosed in U.S. Pat. No. 5,108,502 to Pawlowski, which is incorporated in its entirety by reference herein.

The boronic acid dye may be present in the inkjet ink from approximately 0.05% by weight ("wt %") to approximately 10 wt %. The inkjet ink may also include an aqueous ink vehicle having water or a mixture of water and water-soluble organic solvents. The inkjet ink may include up to approximately 50 wt % of the water soluble organic solvents. The inkjet ink may also include conventional additives, such as surfactants, corrosion inhibitors, buffers, and biocides (anti-microbial agents, anti-fungal agents, etc.), which may be selected depending on the desired properties of the inkjet ink. The inkjet ink may have a pH from between approximately 4 and approximately 9 and may include a sufficient amount of the buffer to maintain this pH range. The inkjet ink may be formulated by conventional techniques.

Figure 2:
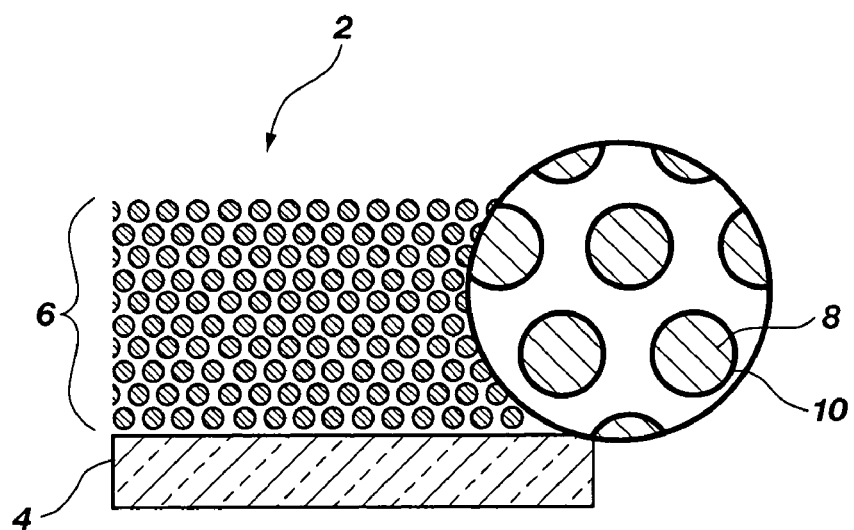
FIG. 2 illustrates the deposition of inkjet ink including the boronic acid dye on the print medium according to a particular embodiment of the invention.

The coated print medium 2 used in the present invention includes a substrate layer 4 and a coating layer 6, as shown in FIGS. 1 and 2. The print medium 2 may be either a swellable medium or a porous medium. The substrate layer 4 may be formed from a transparent, opaque, or translucent material that provides support to the coating layer 6 as the print medium 2 is transported through an inkjet printer. The substrate layer 4 may be formed from a paperbase layer, a photobase layer, or a polymer film. The precise makeup of the substrate layer 4 is not critical to the operability of the present invention and, therefore, is not described in detail herein.

The coating layer 6 of the print medium 2 may include particles 8 of a polyhydroxylated material. As used herein, the term "polyhydroxylated material" refers to an organic or inorganic material having at least two hydroxyl groups that are available for binding with the boron atom. The polyhydroxylated material may include a polyhydroxylated compound having at least two hydroxyl groups located on the same molecule or at least two hydroxylated compounds, each of which has a hydroxyl group on a separate molecule or particle. The polyhydroxylated material may include a chemical compound that is commonly present in the coating layer 6, such as a binder or a filler material, or may include an additive. The hydroxyl groups in the polyhydroxylated compound may be positioned on the same side of the molecule so that they are available for binding with the boron atom. For instance, the polyhydroxylated compound may include a hydrocarbon chain having at least two hydroxyl groups. The hydroxyl groups may be attached to adjacent carbon atoms, such as in a 1,2-cis diol. As used herein, the term "cis-diol" refers to a compound having two hydroxyl groups on the same side of the molecule. The hydroxyl groups may also be attached to non-adjacent carbon atoms as long as the hydroxyl groups are positioned on the same side of the chemical compound, such as in a 1,3-cis diol. Chemical compounds that have cis-1,2-diols or cis-1,3-diols include, but are not limited to, glycols (such as ethylene glycol), cellulose, sugars (such as glucose), polyvinyl alcohol ("PVOH") and starches. It is also contemplated that the hydroxyl groups may be separated by a larger number of atoms if the chemical compound is flexible and has a configuration where the hydroxyl groups are positioned on the same side of the chemical compound.

The polyhydroxylated material may also include at least two hydroxylated compounds, each having a hydroxyl group. In other words, each hydroxyl group may be on a separate molecule or particle of the hydroxylated compound. The hydroxyl groups may be positioned on the same side of a surface so that the boron is able to bind with these groups. For instance, if a layer is formed from the polyhydroxylated material, the hydroxyl groups on each molecule may be positioned on the same side of the layer. The hydroxylated compound may be an inorganic material, such as silica, which has hydroxyl groups on its surface when it is present in aqueous solution. Each particle of silica may have at least one hydroxyl group that faces the same direction when silica is used in the coating layer 6.

The silica may also be chemically modified to include hydroxyl groups. As known in the art, a surface of the silica may be modified to include almost any chemistry, such as hydroxyl groups. The surface of the silica may be modified to include hydroxyl groups or larger molecules having hydroxyl groups, such as short or long hydrocarbon chains having hydroxyl groups (alcohols), aryl groups substituted with hydroxyl groups, sugars, or cellulose derivatives. Similarly, the hydroxylated compound may include alumina or modified alumina.

As previously mentioned, the polyhydroxylated material may also be present in the coating layer 6 as an additive. The additive may be a chemical compound having at least two hydroxyl groups positioned on the same side of the molecule so that the hydroxyl groups are available to bind the boron atom. Unlike PVOH or silica, this additive may include a chemical compound that is typically not present in a conventional coating layer 6. The additive may be present in the coating layer 6 in a sufficient amount to provide the desired permanence without affecting desirable properties of the coating layer 6.

The polyhydroxylated material may be present in the coating layer 6 in an amount sufficient to react with the boronic acid dye to achieve the desired improvement in humid bleed and lightfastness. However, the amount of polyhydroxylated material present may not undesirably affect other properties of the coating layer 6. To achieve the humid fastness and lightfastness, a majority of the boronic acid dye deposited on the print medium, i.e., during printing, may react with the polyhydroxylated material. Preferably, almost all of the boronic acid dye is reacted with the polyhydroxylated material so that almost none of the boronic acid dye remains unreacted and able to migrate on the print medium 2.

To produce the printed image with increased permanence, the inkjet ink 10 having the boronic acid dye may be deposited on the print medium 2, as shown in FIG. 2. The inkjet ink 10 may penetrate the coating layer 6 so that the boronic acid dye comes into contact with the particles 8 of the polyhydroxylated material. The boronic acid dye may react with the polyhydroxylated material, forming the covalent bond between the boronic acid dye and the polyhydroxylated material of the coating layer 6. As shown in the following reaction scheme, the boronic acid dye (Structure 1) may be hydrated in the presence of the aqueous ink vehicle to form an anionic species (Structure 2). The anionic species (Structure 2) reacts with the polyhydroxylated material in the coating layer 6 to form a stable, boron complex (Structure 3) and two molecules of water.

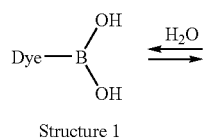

Structure 1

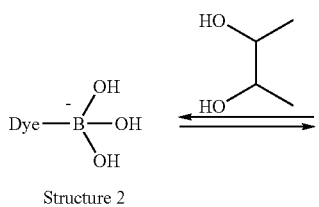

Structure 2

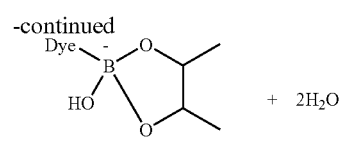

Structure 3

Since the boron complex is covalently bonded to the print medium 2, the boronic acid dye may be securely fixed to the print medium 2. Therefore, migration of the boronic acid dye may be reduced or eliminated even when the printed image is exposed to water or a humid environment. The covalent bond may also improve the stability of the printed image towards light exposure.

In one embodiment of the present invention, the print medium 2 is a porous medium having a sufficient amount of PVOH, silica, or PVOH and silica in the coating layer 6 to react with the boronic acid dye in the inkjet ink. When the inkjet ink is applied to the print medium 2, the printed image has reduced dye bleed, hue shifts, and changes in optical density.

While the embodiments herein describe using a boronic acid dye, it is also contemplated that the boronic acid conjugate may be attached to a pigment to further increase the humid fastness of images printed with a pigment-based inkjet ink.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A printing system comprising:
   a print medium;
   a coating layer on the print medium, wherein the coating layer comprises one or more particles of a polyhydroxylated material having at least two hydroxyl groups positioned for binding with a boronic acid dye; and
   an inkjet ink having the boronic acid dye for binding with at least one of the two hydroxyl groups in the coating layer.

2. The printing system of claim 1, wherein the boronic acid dye comprises a boric acid group or a boronic acid group and a dye selected from the group consisting of azo, triphenylmethane, anthraquinone, methine, xanthine, oxazine, thiazine, azine, thiazole, quinolinone, aminoketone, nitro, nitroso, phthalocyanine, acridine, indamine, and indophenol.

3. The printing system of claim 1, wherein the polyhydroxylated material comprises a polyhydroxylated compound having at least two hydroxyl groups on one molecule of the polyhydroxylated compound.

4. The printing system of 3, wherein the at least two hydroxyl groups are positioned on the same side of the polyhydroxylated compound.

5. The printing system of claim 3, wherein the at least two hydroxyl groups are positioned on adjacent atoms.

6. The printing system of claim 3, wherein the at least two hydroxyl groups are positioned on non-adjacent atoms.

7. The printing system of claim 3, wherein the polyhydroxylated compound is selected from the group consisting of polyvinyl alcohol, cellulose, a sugar, and a starch.

8. The printing system of claim 1, wherein the polyhydroxylated material comprises at least two hydroxylated compounds, each hydroxylated compound having at least one hydroxyl group.

9. The printing system of 8, wherein the at least one hydroxyl group on each of the at least two hydroxylated compounds is positioned on the same side of the polyhydroxylated material.

10. The printing system of claim 8, wherein the hydroxylated compound comprises silica or a modified silica.

11. A method of reducing dye migration on a print medium, comprising:
    providing a print medium having a coating layer having one or more particles of a polyhydroxylated material having at least two hydroxyl groups positioned for binding with a boronic acid dye;
    applying an inkjet ink comprising the boronic acid dye to the coating layer of the print medium; and
    forming a covalent bond between the boronic acid dye and the polyhydroxylated material on the coating layer to reduce dye migration.

12. The method of claim 11, wherein the one or more particles of polyhydroxylated material comprises a polyhydroxylated compound having at least two hydroxyl groups on one molecule of the polyhydroxylated compound or at least two hydroxylated compounds, each hydroxylated compound having at least one hydroxyl group.

13. The method of claim 12, wherein the polyhydroxylated material comprises polyvinyl alcohol, cellulose, sugar, starch, silica, or modified silica.

14. The method of claim 11, wherein applying an inkjet ink comprising a boronic acid dye to the print medium comprises applying the inkjet ink comprising a boric acid group or a boronic acid group attached to a dye selected from the group consisting of azo, triphenylmethane, anthraquinone, methine, xanthine, oxazine, thiazine, azine, thiazole, quinolinone, aminoketone, nitro, nitroso, phthalocyanine, acridine, indamine, and indophenol.

15. The method of claim 11, wherein forming a covalent bond between the boronic acid dye and the coating layer comprises forming a covalent bond between the boronic acid dye and the at least two hydroxyl groups in the polyhydroxylated compound or the hydroxyl groups in the at least two hydroxylated compounds.

16. A printed image having improved permanence, comprising:
    a boronic acid dye covalently bonded to one or more particles of a polyhydroxylated material on a coated print medium, wherein the one or more particles of the polyhydroxylated material comprises a polyhydroxylated compound having at least two hydroxyl groups on one molecule of the polyhydroxylated compound or at least two hydroxylated compounds, each hydroxylated compound having at least one hydroxyl group.

* * * * *